Figure 1:
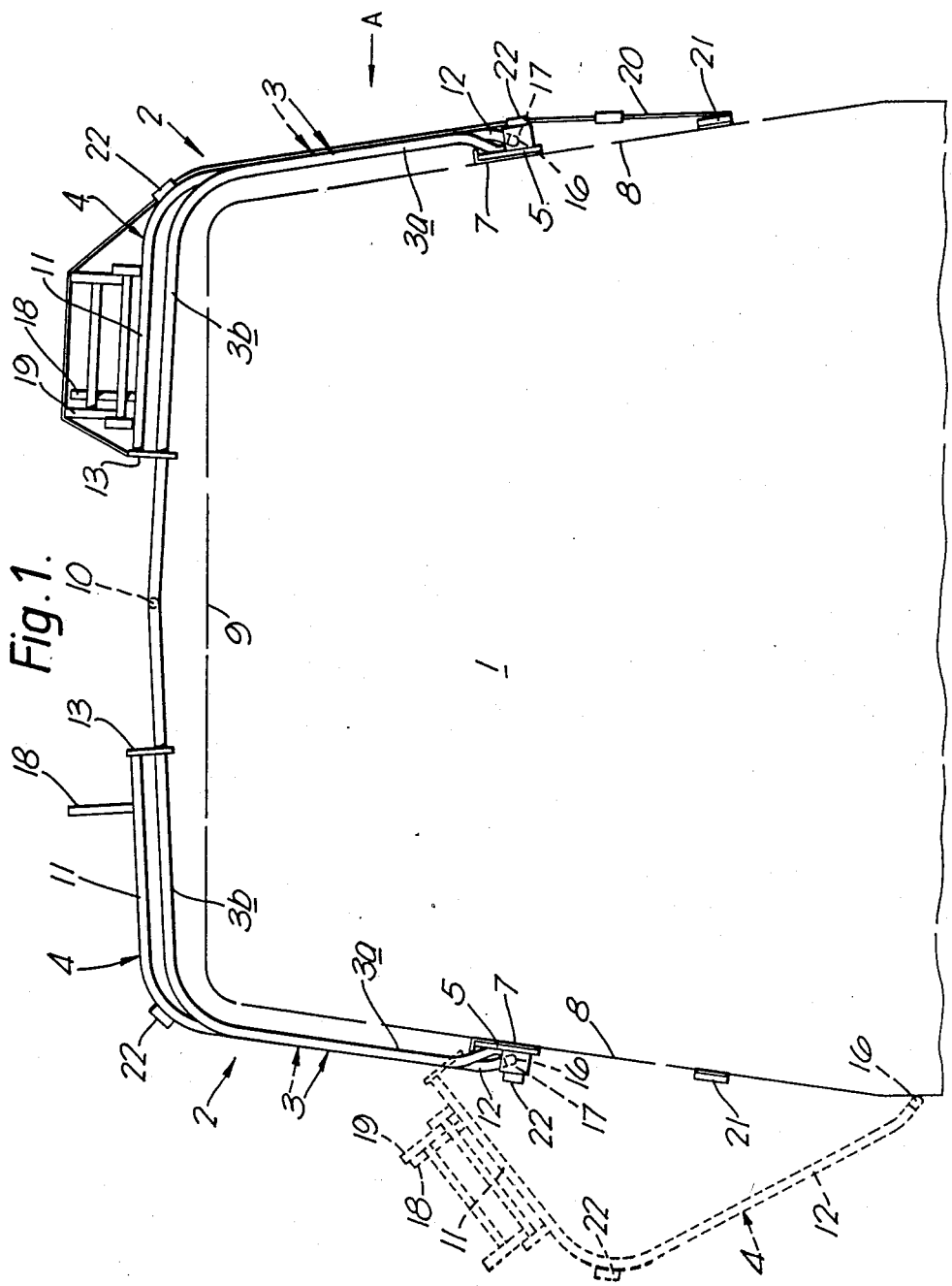

United States Patent [19]

Dainty

[11] Patent Number: 4,887,750

[45] Date of Patent: Dec. 19, 1989

[54] RACK ARRANGEMENT

[75] Inventor: Robin K. Dainty, Brighton, England

[73] Assignee: British Gas plc, London, England

[21] Appl. No.: 181,175

[22] Filed: Apr. 13, 1988

[30] Foreign Application Priority Data

Apr. 13, 1987 [GB] United Kingdom .................. 8708804

[51] Int. Cl.$^4$ .......................... E06C 5/04; B60R 11/06
[52] U.S. Cl. ................................. 224/42.11; 224/310;
224/326; 182/127; 414/462
[58] Field of Search ............... 224/280, 281, 310, 314,
224/309, 317, 42.03 R, 42.11, 317, 326, 327,
330; 414/462, 540, 541; 182/127, 92; 384/29,
42; 248/124, 125, 201, 202.1, 210, 219.1, 316.8;
211/94, 94.5, 162

[56] References Cited

U.S. PATENT DOCUMENTS

| | | | |
|---|---|---|---|
| 1,991,900 | 2/1935 | Larsen | 248/201 |
| 2,237,853 | 4/1941 | Troche | 182/127 |
| 2,551,351 | 5/1951 | Swenson | 224/310 |
| 2,683,891 | 7/1954 | Rosenbaum | 211/94 |
| 2,946,397 | 7/1970 | Berberich | 414/462 |
| 3,054,645 | 9/1962 | Evans | 384/42 |
| 3,490,558 | 1/1970 | Foley | 182/127 |
| 3,963,136 | 6/1976 | Spanke | 224/310 |
| 4,063,659 | 12/1977 | Welch | 224/310 |
| 4,081,095 | 3/1978 | Wilburn et al. | 414/462 |
| 4,114,945 | 9/1978 | Lutz | 384/42 |
| 4,240,571 | 12/1980 | Ernst | 224/310 |
| 4,322,869 | 4/1982 | Jordan | 16/46 |

FOREIGN PATENT DOCUMENTS

| | | |
|---|---|---|
| 3318891 | 11/1984 | Fed. Rep. of Germany . |
| 8703067 | 11/1987 | Fed. Rep. of Germany . |
| 986618 | 2/1951 | France . |
| 2399366 | 2/1979 | France . |
| 1375407 | 11/1974 | United Kingdom . |
| 2118501 | 11/1983 | United Kingdom . |
| 2177055 | 1/1987 | United Kingdom . |

Primary Examiner—Henry J. Recla
Assistant Examiner—J. Casimer Jacyna
Attorney, Agent, or Firm—Oblon, Spivak, McClelland, Maier & Neustadt

[57] ABSTRACT

A rack arrangement for supporting a load, for example above the roof of a vehicle body, comprises a pair of substantially parallel elongate guide members 3 each having a lower upwardly extending portion 3a and an upper load supporting portion 3b. A load carrier member 4 is rockably connected to the guide members and is manually slidable from a lowered position upwardly along the lower guide member portions 3a onto the supporting portions 3b to a load storage position. Means is provided for releasably retaining the carrier member in the load storage position, for example a cup-like recess 17 which locates the base of a handle 12 for the carrier member.

16 Claims, 2 Drawing Sheets

RACK ARRANGEMENT

The present invention relates to rack arrangements for supporting loads and, more particularly, to a rack arrangement which includes a facility to move a load to a load storage position.

With known rack arrangements such as roof racks carried by vehicle bodies, loads may have to be lifted onto the racks by hand. In cases where the racks are on high roofed vans or lorries, persons loading the racks may have difficulty when handling awkward loads such as multi-section ladders.

According to one aspect of the invention, a rack arrangement comprises two substantially parallel elongate guide members each having a lower upwardly extending portion and an upper load supporting portion, a load carrier member rockably connected to the guide members and manually slidable from a lowered position upwardly along the lower guide member portions onto the supporting portions to a load storage position, and means for releasably retaining the carrier member in the load storage position.

Preferably, the carrier member is connected to the guide members by a mounting member having two apertures lined with or formed from a friction reducing material, each aperture accommodating a respective one of the guide members with clearance. The provision of clearance allows the mounting member, which may be in the form of an apertured plate, to be relatively loosely connected to the guide members to allow the carrying member to be waggled about or rocked to a limited extent from side-to-side and back and forth with respect to the guide members. Thus the mounting member can be slid along the guide members without the apertures and guide members having to be exactly coaxially disposed to each other.

The carrier member may have depending handle means to facilitate sliding it upwardly onto the supporting portions of the guide members. The handle means may be so disposed as to lie between the lower portions of the guide members when the carrier member is in the load storage position. conveniently, the releasably retaining means is in the form of a cup-like recess which locates the base of the handle means.

An adjustable strap means may be provided for securing a load to the carrier member when in the storage position, conveniently with the strap means being tensionable over guide means which are provided on the carrier member, and on depending handle means if present, to assist in retaining the carrier member in the storage position.

Advantageously, the carrier member comprises means to retain a load in position thereon whilst the carrier member is being slid from the lowered position upwardly onto the supporting portions of the guide members. In one embodiment, the means to retain the load may be an upstanding post, over which, for example, a load may be hung.

The carrier member may be inclined to the vertical when in the lowered position and relatively more horizontally disposed when the in the load storage position.

The guide members may be connected to means to facilitate fixing the arrangement to a body to support the arrangement.

From another aspect, the invention also consists in a rack combination which comprises a pair of rack arrangements, each as defined above, wherein the two arrangements are disposed with respect to each other such that the carrier members are capable of carrying different parts of a common load and are operable to cooperate in moving the common load to the load storage position. Each carrier member may, for example, be in the form of a tube or a bar and cooperate to support an elongate load, such as a ladder.

From a further aspect, the invention also comprises a back-to-back rack combination comprising two rack combination, each as defined above, wherein the supporting portions of the guide members of each rack arrangement of one pair of arrangements are joined to respective support members of the other pair of rack arrangements.

From a still further aspect, the invention comprises a vehicle body having mounted thereon a rack arrangement, a rack combination or a back-to-back arrangement, as defined above, with the supporting portions of the guide members extending over the roof of the vehicle.

Figure 2:
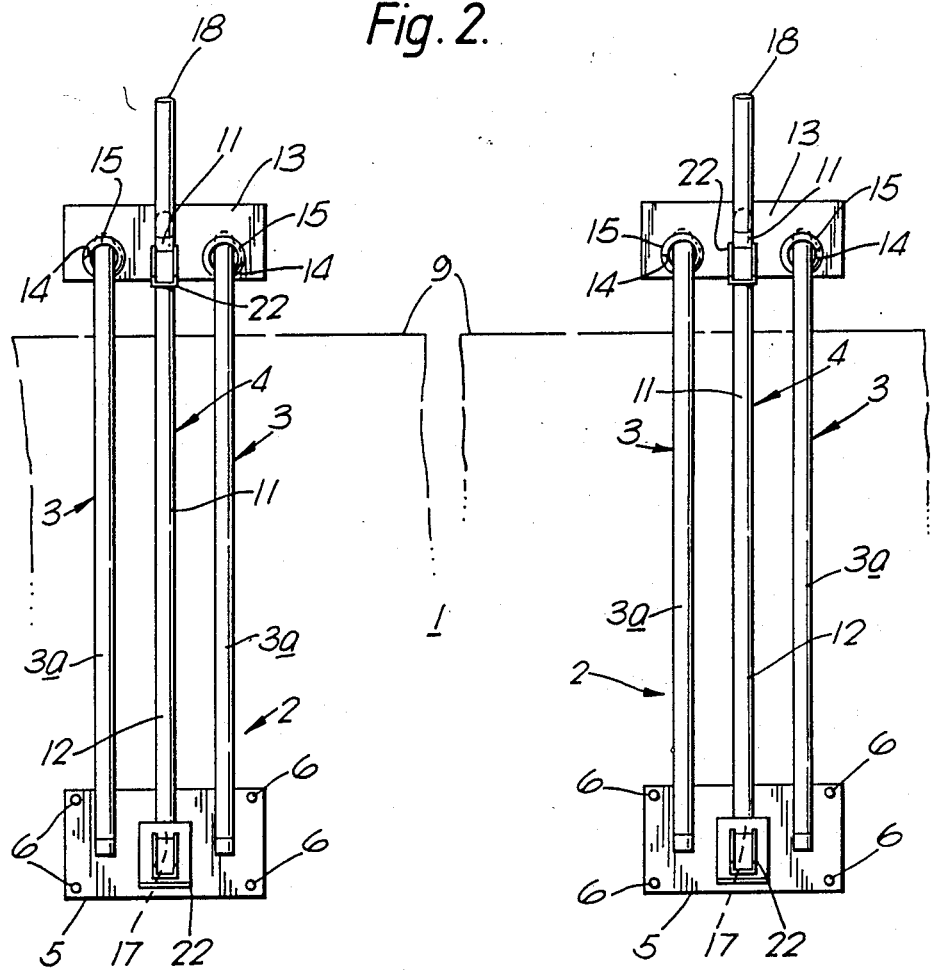

The invention will now be described, by way of example, with reference to the accompanying drawings, in which:

FIG. 1 is a view showing from one end the outline of part of a vehicle body having mounted thereon one embodiment of back-to-back rack arrangement according to the invention, and FIG. 2 is a view from one side of part of the vehicle body shown in FIG. 1 as seen in the direction of arrow "A" in FIG. 1 with the adjustable strap and mounting element therefor omitted.

Referring to the drawings, on each side of a vehicle body 1 there is mounted a pair of rack arrangements 2, each arrangement comprising two spaced substantially parallel elongate guide members 3 and a load carrier member 4 slidably mounted on the guide members. The guide members 3 and carrier members 4 are of rigid tubular construction and may be made of aluminium alloy. The lower ends of the guide members are connected to a metal plate 5 which is fastened to the vehicle body 1 by fastening means 6. One or more cushioning elements such as rubber pads 7 may be located between the plate 5 and vehicle body to protect the latter from damage. From the plate 5 the tubular guide members 3 provide lower upwardly extending portions 3a, spaced from the side 8 of the vehicle body, which then bend round to form supporting portions 3b which extend slightly upwardly over, and are spaced from, the roof 9 of the body. Supporting portions 3b of the guide members of each rack arrangement of one pair on one side of the vehicle body integrally join with respective supporting portions 3b of the other pair of rack arrangements on the other side of the vehicle body. A brace member 10 may connect the pair of joined supporting portions to provide additional rigidity to the structure.

Each carrier member 4 is disposed centrally of the associated guide members 3 and is of angular form, one limb of which provides a load carrying portion 11 and the other limb of which provides a depending integral handle 12.

The end of the carrying portion 11 remote from the handle 12 is rigidly connected, for example by welding to a mounting plate 13, made for example of steel, which connects the carrier member to the guide members. The plate 13 slidably mounts the carrier member 4 on the guide members 2 by means of two apertures 14 each provided with a friction-reducing bush 15, made for example of plastics material, to facilitate sliding of the plate 13 along the guide members 3.

Each aperture 14 accommodates a respective one of the guide members 3 with clearance so that the carrier member 4 is rockable to a limited extent, with respect to the guide members 3, from side-to-side and back and forth. With reference to the drawings, that is movement back and forth in the plane of the paper and also into and out of the plane of the paper. In the present embodiment the clearance is provided by ensuring that the diameter of the apertures 14, with the bushes 15 present, is sufficiently larger than the external diameter of the tubular guide members 3 for the plate 13 to be a loose fit on the guide members.

By means of the the handle 12, which may have a rubber foot 16 on its free end, the carrier member 4 can be manually slid from a lowered position, as shown in broken lines in FIG. 1, upwardly long the lower guide member portions 3a and onto the supporting portions 3b to the load storage position as shown in the drawings.

In the storage position the mounting plate 13 connected to the guide member bears on the supporting portions 3b whilst the end of the handle 12 has been releasably located in a cup-like recess 17 provided on the metal plate 5 between the lower ends of the guide members. The location of the handle 12 in the cup-like recess 17 retains the carrier member 4 in the load storage position, whereat the load carrying portion 11 of the carrier member is disposed at a level above the supporting portions 3b of the guide members whilst the handle lies in a plane substantially common with the two lower portions 3b of the guide members.

In the present embodiment each carrier member 4 has an upstanding pin or post 18 over which a ladder 19 can be placed when the carrier member 4 is in the lowered position, as shown in outline in FIG. 1. If the ladder 19 is placed in this manner on both of the carrier members 4 on the same side of the vehicle body, then the ladder will be retained on the two carrying portions 11 when they are raised independently but generally at the same time by two persons each operating a different one of the two carrier members. Thus the carrier members 4 can be moved to the load supporting position whereat the ladder is stowed on the carrying portions 11 which are clear of the vehicle roof. Since the carrier members 4 are rockable on the guide member 3, as described above, the likelihood of the carrier members binding on the guide members is reduced as they are moved therealong.

To further secure both the carrier member 4 and the ladder 19 in the load storage position, an adjustable tensioning strap 20 is provided, which is releasably fastened at one end to the mounting plate 13 and at the other end to a mounting element 21 secured to the vehicle body, as shown on the right hand side of FIG. 1. The fastening may be by means of hooks at the ends of the strap (not shown) which pass through apertures (not shown) in the mounting plate 13 and in the mounting element 21. The adjustable strap 20 is tightened over strap guide means in the form of open channel-like elements 22 provided on the outside of the angle between the handle 12 and the load carrying portion 11 of the carrier member, and on the cup-like handle-locating recess 17. When there is no load on the carrier member 4, tensioning of the strap 20 secures the carrier member alone in the load storing position.

Whilst a particular embodiment has been described above it will be understood that various modifications may be made without departing from the scope of the invention. For example, in an alternative embodiment (not shown) a pair of rack arrangements may be provided on one side only of a vehicle body, with the supporting portions of the guide members having depending legs fastened to the roof of the vehicle body. In a further embodiment (also not shown) a rack arrangement may comprise just two guide members, spaced more remotely apart, which support a single carrier member which may be in the form of a tray-like load-receiving member.

Moreover, the load carrying portions of the carrier member may lie in a plane substantially common to the supporting portions of the guide members such that a supported load may also rest directly on the supporting portions as well as on the load carrying portions. Furthermore, the various rack arrangements and combinations according to the invention may be mounted on supporting bodies other than vehicle bodies.

It will also be appreciated that rack arrangements and combinations according to the invention may be supplied as kits of parts which may have accompanying instructions for assembly and fixing on to a supporting body such as a vehicle body.

I claim:

1. A rack arrangement comprising two substantially parallel elongate guide members each having a lower generally vertically extending portion and an upper generally horizontally extending load supporting portion; a load carrier member movably connected to the guide members and manually slidable from a lowered position upwardly along the lower guide member portions onto the supporting portions to a load storage position, said carrier member including means for holding a load thereto and having a mounting member with two apertures defined by a friction reducing material, said guide members extending through a respective one of said apertures and each aperture surrounding a respective one of the guide members with sufficient clearance so as to be in loose, rockable, slidable, frictional engagement therewith; and means for releasably retaining the carrier member in the load storage position, whereby said mounting member is movable relative to said guide members by frictional sliding contact between said friction reducing material and said guide members while rocking said carrier member.

2. A rack arrangement as claimed in claim 1, wherein the carrier member has depending handle means to facilitate sliding it upwardly onto the supporting portions.

3. A rack arrangement as claimed in claim 2, wherein when the carrier member is in the load storage position the handle means lies between the lower portions of the guide members.

4. A rack arrangement as claimed in claim 2 or 21, wherein the releasably retaining means is in the form of a cup-like recess which locates the base of the handle means.

5. A rack arrangement as claimed in claim 2, wherein the carrier member, mounting member and handle means together form a rigid construction.

6. A rack arrangement as claimed in claim 1, wherein an adjustable strap means is provided for securing a load to the carrier member when in the load storage position.

7. A rack arrangement as claimed in claim 1, wherein guide means are provided on the carrier member over which the strap means can be tensioned to assist in retaining the carrier member in the load storage position.

8. A rack arrangement as claimed in claim 1, wherein said carrier member comprises means to retain a load in position thereon whilst the carrier member is being slid from the lowered position upwardly onto the supporting portions.

9. A rack arrangement as claimed in claim 1, wherein the carrier member is inclined to the vertical when in the lowered position and relatively more horizontally disposed when in the load storage position.

10. A rack arrangement as claimed in claim 1, wherein the guide members are connected to means to facilitate fixing the arrangement to a body to support the arrangement.

11. A rack combination comprising a pair of rack arrangements as claimed in claim 1, wherein the two arrangements are disposed with respect to each other such that the carrier members are capable of carrying different parts of a common load and are operable to cooperate in moving the common load to the load storage position.

12. A rack combination as claimed in claim 11, wherein each carrier member is in the form of a bar or a tube.

13. A back-to-back rack combination comprising two rack combinations as claimed in claim 11 or 12, wherein the supporting portions of the guide members of each rack arrangement of one pair are joined to respective supporting portions of the other pair of rack arrangements.

14. A vehicle body having mounted thereon a back-to-back rack combination as claimed in claim 13, with the supporting portions extending over the roof of the vehicle and the upwardly extending portions extending up opposite sides of the vehicle.

15. A vehicle body having mounted thereon a rack combination as claimed in claim 11 or 12, with the supporting portions extending over the roof of the vehicle.

16. A vehicle body having mounted thereon a rack arrangement as claimed in claim 1, with the supporting portions extending over the roof of the vehicle.

* * * * *